US012573767B2

(12) United States Patent
Komulainen et al.

(10) Patent No.: US 12,573,767 B2
(45) Date of Patent: Mar. 10, 2026

(54) TECHNIQUE FOR CONFIGURING SMART ANTENNA FOR Wi-Fi ACCESS POINT

(71) Applicant: Nokia Solutions and Networks Oy, Espoo (FI)

(72) Inventors: Mikko Komulainen, Oulu (FI); Ronny Peeters, Hoboken (BE); Tom Rudolf E Van Driessche, Hamme (BE)

(73) Assignee: Nokia Solutions and Networks Oy, Espoo (FI)

( * ) Notice: Subject to any disclaimer, the term of this patent is extended or adjusted under 35 U.S.C. 154(b) by 368 days.

(21) Appl. No.: 18/298,527

(22) Filed: Apr. 11, 2023

(65) Prior Publication Data

US 2024/0347929 A1 Oct. 17, 2024

(51) Int. Cl.

| | |
|---|---|
| ***H04L 12/28*** | (2006.01) |
| ***H01Q 3/24*** | (2006.01) |
| ***H01Q 21/12*** | (2006.01) |

(52) U.S. Cl.

CPC ............... *H01Q 21/12* (2013.01); *H01Q 3/24* (2013.01)

(58) Field of Classification Search

CPC .......... H01Q 21/12; H01Q 3/24; H04B 7/061; H04B 7/0874; H04B 7/0608; H04B 7/0602; H04B 7/0802; H04W 88/08; H04W 84/18; H04L 41/12; H04L 45/02; H04L 45/00; H04L 45/04

See application file for complete search history.

(56) References Cited

U.S. PATENT DOCUMENTS

2006/0073850 A1* 4/2006 Cha ...................... H04B 7/0608 455/562.1
2007/0258537 A1* 11/2007 Mailaender .......... H04B 7/0689 375/267
2011/0249576 A1* 10/2011 Chrisikos ............. H04B 7/0691 370/252

(Continued)

OTHER PUBLICATIONS

Santoboni, Marco, et al. "Wireless LAN sensing with smart antennas." 2022 16th European Conference on Antennas and Propagation (EuCAP). Madrid, Spain (2022): 1-5.

(Continued)

*Primary Examiner* — Phuongchau Ba Nguyen
(74) *Attorney, Agent, or Firm* — Mendelsohn Dunleavy, P.C.; Steve Mendelsohn

(57) ABSTRACT

An optimal arrangement for a configurable smart antenna in a wireless (e.g., Wi-Fi) network having zero, one, or more other mesh nodes is determined by characterizing the network performance for each possible arrangement by determining a number of connected devices (e.g., either client devices or mesh nodes) and one or more other performance parameters. If one arrangement has more connected devices than any other, then that arrangement is selected. If two or more arrangements have the same greatest number of connected devices, then one or more other performance parameters are applied either serially or in parallel to select the optimal arrangement. In some implementations, the other performance parameters are sums or averages for all connected devices. In other implementations, the other performance parameters are for only a selected priority device, where the selected arrangement must connect to the priority device.

21 Claims, 8 Drawing Sheets

(56) References Cited

U.S. PATENT DOCUMENTS

| | | | | |
|---|---|---|---|---|
| 2014/0009338 | A1* | 1/2014 | Lin | H01Q 25/00 342/374 |
| 2014/0128032 | A1* | 5/2014 | Muthukumar | H04W 52/0254 455/412.2 |
| 2014/0220902 | A1* | 8/2014 | Clevorn | H04B 7/061 455/226.4 |
| 2016/0095130 | A1* | 3/2016 | Ho | H04B 7/0695 370/329 |
| 2016/0165619 | A1 | 6/2016 | McMilin et al. | |
| 2019/0089426 | A1 | 3/2019 | Liu | |
| 2019/0190584 | A1* | 6/2019 | Fang | H04B 7/0691 |
| 2020/0145163 | A1 | 5/2020 | Schelstraete | |
| 2021/0005985 | A1* | 1/2021 | Liu | H01Q 25/002 |
| 2021/0333355 | A1 | 10/2021 | Lin et al. | |
| 2021/0344461 | A1 | 11/2021 | Bhanage et al. | |
| 2022/0109477 | A1* | 4/2022 | Krishnamachari | H01Q 19/22 |
| 2022/0190889 | A1 | 6/2022 | Lee et al. | |

OTHER PUBLICATIONS

Extended European Search Report dated Aug. 26, 2024 issued in the corresponding European patent application No. 24163377.5 (10 pages).

* cited by examiner

THETA/DEGREE

AZIMUTH PLANE RADIATION PATTERN OF HIGH-GAIN ANTENNAS

AZIMUTH PLANE RADIATION PATTERN OF OMNI-DIRECTIONAL ANTENNAS

500A

500B

500C

600

700

800

| COLUMN A | COLUMN B | COLUMN C | COLUMN D | COLUMN E | COLUMN F | COLUMN G | COLUMN H |
|---|---|---|---|---|---|---|---|
| ANTENNA ARRANGEMENT | SUM OF DL TP OF CONNECTED DEVICES | SUM OF DL TP OF CONNECTED DEVICES RANK | AVE UL TP PER CONNECTED DEVICE | AVE UL TP PER CONNECTED DEVICE RANK | AVE RSSI PER CONNECTED DEVICE | AVE RSSI PER CONNECTED DEVICE RANK | SUM OF RANKS |
| #1 | 1030 Mbps | 4 | 330 Mbps | 4 | −82 dBm | 4 | 12 |
| #2 | 1150 Mbps | 2 | 420 Mbps | 1 | −78 dBm | 2 | 5 |
| #3 | 1050 Mbps | 3 | 390 Mbps | 3 | −80 dBm | 3 | 9 |
| #4 | 1200 Mbps | 1 | 410 Mbps | 2 | −77 dBm | 1 | **4** |

FIG. 10

1000

| COLUMN A | COLUMN B | COLUMN C | COLUMN D | COLUMN E | COLUMN F | COLUMN G | COLUMN H |
|---|---|---|---|---|---|---|---|
| ANTENNA ARRANGEMENT | DL TP OF PRIORITY DEVICE | DL TP OF PRIORITY DEVICE RANK | UL TP OF PRIORITY DEVICE | UL TP OF PRIORITY DEVICE RANK | RSSI OF PRIORITY DEVICE | RSSI OF PRIORITY DEVICE RANK | SUM OF RANKS |
| #1 | 375 Mbps | 4 | 340 Mbps | 4 | −83 dBm | 4 | 12 |
| #2 | 400 Mbps | 2 | 430 Mbps | 1 | −77 dBm | 2 | 5 |
| #3 | 395 Mbps | 3 | 380 Mbps | 3 | −81 dBm | 3 | 9 |
| #4 | 410 Mbps | 1 | 405 Mbps | 2 | −76 dBm | 1 | **4** |

TECHNIQUE FOR CONFIGURING SMART ANTENNA FOR Wi-Fi ACCESS POINT

BACKGROUND

Field of the Disclosure

The present disclosure relates to communications and, more specifically but not exclusively, to techniques for configuring smart antennas for Wi-Fi access points.

Description of the Related Art

This section introduces aspects that may help facilitate a better understanding of the disclosure. Accordingly, the statements of this section are to be read in this light and are not to be understood as admissions about what is prior art or what is not prior art.

A smart antenna is an antenna system that can be configured in a variety of different arrangements having different coverage areas. It is desirable to deploy a smart antenna at the access point of a Wi-Fi network and configure the smart antenna to optimize coverage of devices (e.g., client devices or wireless mesh nodes) near the access point.

SUMMARY

In at least one embodiment of the present disclosure, a controller-implemented method for configuring a smart antenna having a plurality of arrangements in a wireless network, each arrangement having a corresponding antenna pattern, the method comprising an electronic controller of the wireless network (i) characterizing performance of the wireless network for each arrangement, (ii) rating the characterized performances for the plurality of arrangements, (iii) selecting an arrangement having a highest-rated characterized performance, and (iv) configuring the smart antenna based on the selected arrangement.

In at least some of the above embodiments, the method further comprises selecting a priority device and requiring the selected arrangement to connect to the priority device.

In at least some of the above embodiments, for each arrangement, characterizing the performance comprises determining a number of connected devices and determining one or more other performance parameters.

In at least some of the above embodiments, upon determining that one arrangement is associated with a greater number of connected devices than all other arrangements, then the one arrangement is selected as having the highest-rated characterized performance.

In at least some of the above embodiments, upon determining that two or more arrangements are associated with a same, greater number of connected devices than all other arrangements, then one or more of the other performance parameters are used to select the arrangement having the highest-rated characterized performance.

In at least some of the above embodiments, the one or more other performance parameters are applied serially to select the arrangement having the highest-rated characterized performance.

In at least some of the above embodiments, the one or more other performance parameters are applied in parallel to select the arrangement having the highest-rated characterized performance.

In at least some of the above embodiments, the characterized performances are rated based on the one or more performance parameters for only a specified priority device, and the one or more performance parameters comprise one or more of (1) downlink (DL) throughput (TP) for the priority device; (2) uplink (UL) TP for the priority device; and (3) received signal strength (RSSI) for the priority device.

In at least some of the above embodiments, the characterized performances are rated based on the one or more performance parameters for all connected devices, and the one or more performance parameters comprise one or more of (1) sum of DL TP for the connected devices; (2) average DL TP for the connected devices; (3) sum of UL TP for the connected devices; (4) average UL TP for the connected devices; (5) sum of RSSI for the connected devices; and (6) average RSSI for the connected devices.

In at least some of the above embodiments, the wireless network comprises the smart antenna as its only wireless node, and the connected devices are client devices that are connected to the smart antenna.

In at least some of the above embodiments, the wireless network comprises the smart antenna and one or more mesh nodes, and the connected devices are client devices that are connected to the wireless network.

In at least some of the above embodiments, the wireless network comprises the smart antenna and one or more mesh nodes, and the connected devices are mesh nodes that are connected to the smart antenna.

In at least some of the above embodiments, the wireless network is a Wi-Fi network; upon determining that one arrangement is associated with a greater number of connected devices than all other arrangements, then the one arrangement is selected as having the highest-rated characterized performance; upon determining that two or more arrangements are associated with the same, greater number of connected devices than all other arrangements, then one or more of the other performance parameters are used to select the arrangement having the highest-rated characterized performance; and the characterized performances are rated based on the one or more performance parameters for all connected devices.

In at least some of the above embodiments, the one or more other performance parameters are applied serially to select the arrangement having the highest-rated characterized performance.

In at least some of the above embodiments, the one or more other performance parameters are applied in parallel to select the arrangement having the highest-rated characterized performance.

In at least some of the above embodiments, the one or more performance parameters comprise one or more of (1) sum of DL TP for the connected devices; (2) average DL TP for the connected devices; (3) sum of UL TP for the connected devices; (4) average UL TP for the connected devices; (5) sum of RSSI for the connected devices; and (6) average RSSI for the connected devices.

In at least some of the above embodiments, the wireless network is a Wi-Fi network; a priority device is selected; only arrangements that connect to the priority device are retained; upon determining that one retained arrangement is associated with a greater number of connected devices than all other retained arrangements, then the one retained arrangement is selected as having the highest-rated characterized performance; upon determining that two or more retained arrangements are associated with a same, greater number of connected devices than all other retained arrangements, then one or more of the other performance parameters are used to select the retained arrangement having the highest-rated characterized performance; and the characterized performances are rated based on the one or more performance parameters for only the priority device.

In at least some of the above embodiments, the one or more other performance parameters are applied serially to select the retained arrangement having the highest-rated characterized performance.

In at least some of the above embodiments, the one or more other performance parameters are applied in parallel to select the retained arrangement having the highest-rated characterized performance.

In at least some of the above embodiments, the one or more performance parameters comprise one or more of (1) DL TP for the priority device; (2) UL TP for the priority device; and (3) RSSI for the priority device.

BRIEF DESCRIPTION OF THE DRAWINGS

Embodiments of the disclosure will become more fully apparent from the following detailed description, the appended claims, and the accompanying drawings in which like reference numerals identify similar or identical elements.

FIG. 10 presents a table 1000 that tabulates the values for three different performance parameters for the priority device considered in parallel for one possible implementation of the method of FIG. 1.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
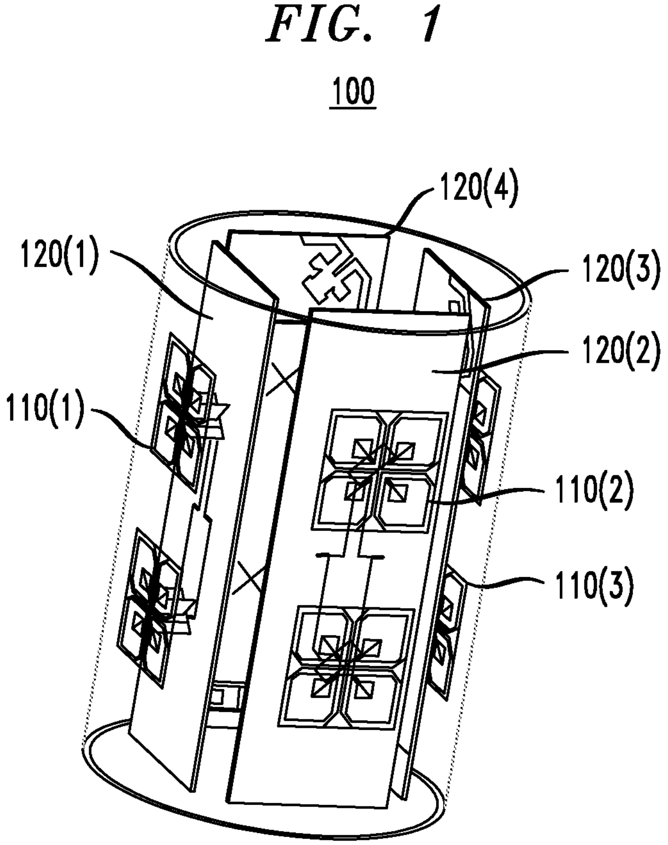
FIG. 1 is a schematic representation of a smart antenna capable of being deployed at the access point of a Wi-Fi communication network.

FIG. 1 is a schematic representation of a smart antenna 100 capable of being deployed at the access point (AP) of a Wireless Fidelity (Wi-Fi) communication network. Smart antenna 100 has four high-gain, directional antennas 110(1)-110(4) oriented 90 degrees apart and four low-gain, omnidirectional (omni) antennas 120(1)-120(4), where the high-gain antennas 110 have longer ranges, but narrower coverage areas than the omni antennas 120. Note that only three of the four high-gain antennas (i.e., 110(1)-110(3)) are visible in the view of FIG. 1.

Figure 2:
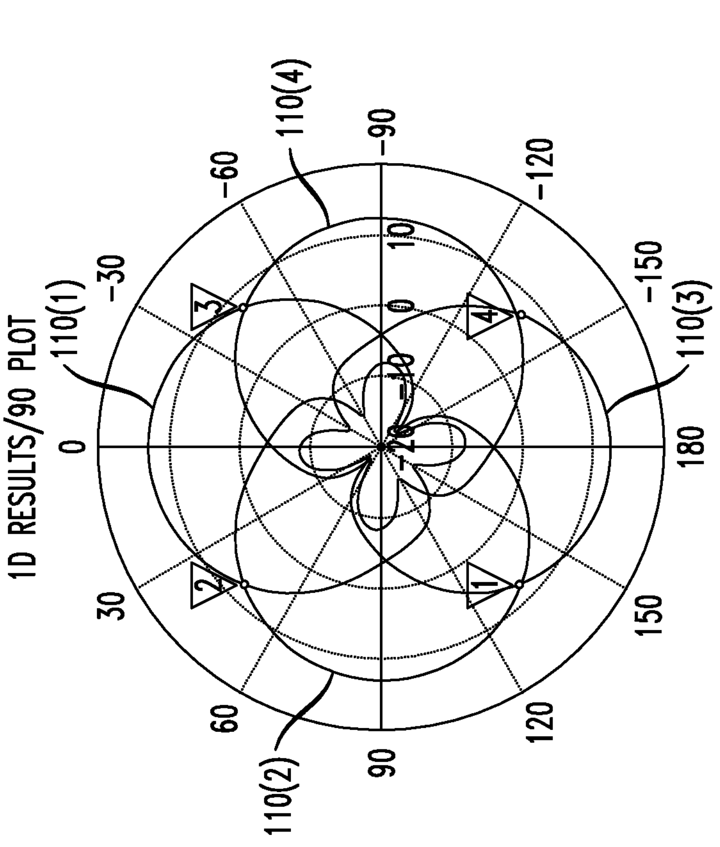
FIG. 2 is a graphical representation of the radiation patterns of the four high-gain antennas of the smart antenna of FIG. 1.
Figure 3:
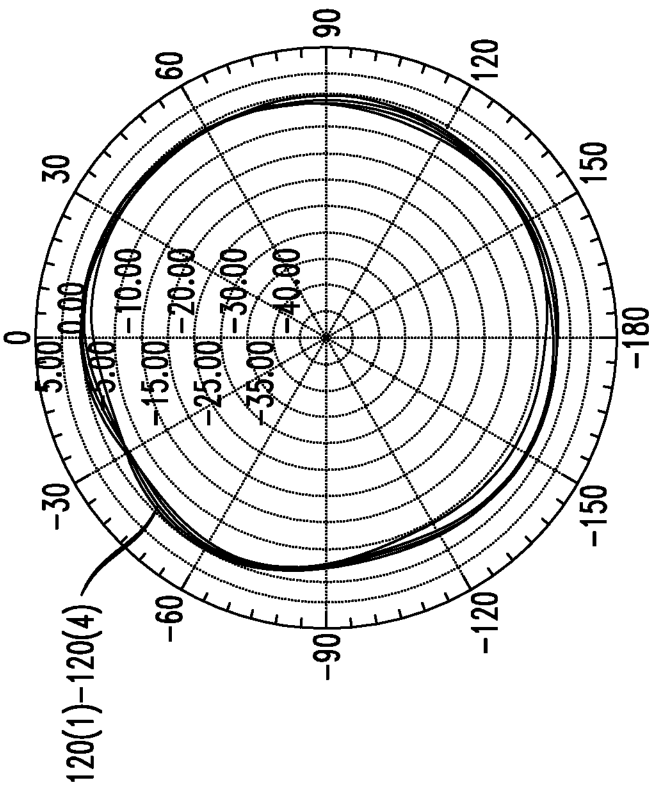
FIG. 3 is a graphical representation of the substantially identical radiation patterns of the four omni antennas of the smart antenna of FIG. 1.
Figure 4A:
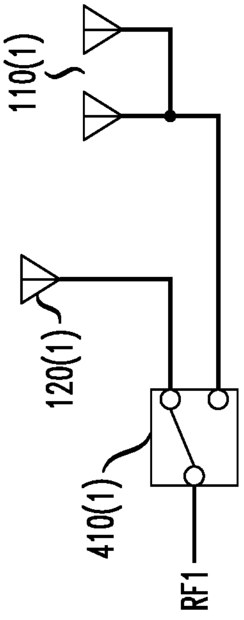
FIGS. 4A-4D are respective schematic representations of four RF switches used to control the configuration of the smart antenna of FIG. 1.
Figure 4B:
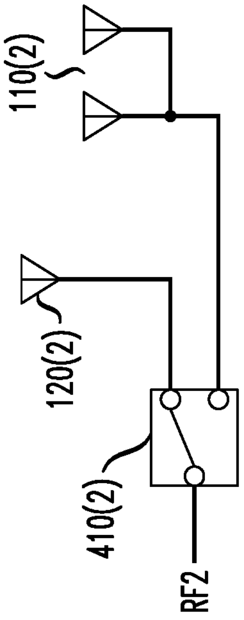
Figure 4C:
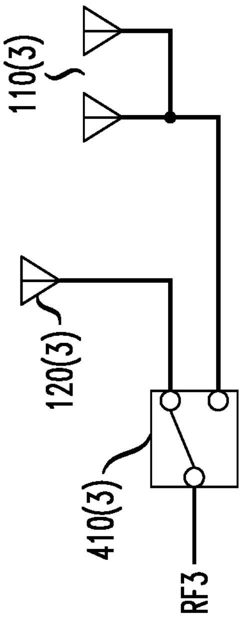
Figure 4D:
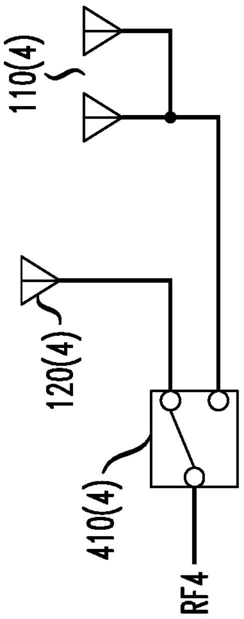

FIG. 2 is a graphical representation of the radiation patterns of the four high-gain antennas 110(1)-110(4), and FIG. 3 is a graphical representation of the substantially identical radiation patterns of the four omni antennas 120(1)-120(4).

FIGS. 4A-4D are respective schematic representations of four radio frequency (RF) switches 410(1)-410(4) used to control the configuration of smart antenna 100 of FIG. 1. For example, RF switch 410(1) controls whether high-gain antenna 110(1) or omni antenna 120(1) is selected for a given arrangement of smart antenna 100, and analogously for each of the other three RF switches 410(2)-410(4). The four RF switches 410(1)-410(4) can be independently controlled to configure smart antenna 100 into any one of the following 16 different arrangements:

- One arrangement with all four omni antennas 120 selected;
- Four different arrangements with one high-gain antenna 110 and three omni antennas 120 selected;
- Six different arrangements with two high-gain antennas 110 and two omni antennas 120 selected;
- Four different arrangements with three high-gain antenna 110 and one omni antenna 120 selected;
- One arrangement with all four high-gain antennas 110 selected.

Those skilled in the art will understand that smart antenna 100 of FIG. 1 is just one possible implementation of a configurable smart antenna. In general, a configurable smart antenna may have any suitable number of antennas having one or more different suitable beampatterns arranged in any suitable orientation with respect to one another and configurable in any suitable number of different arrangements.

Figure 5A:
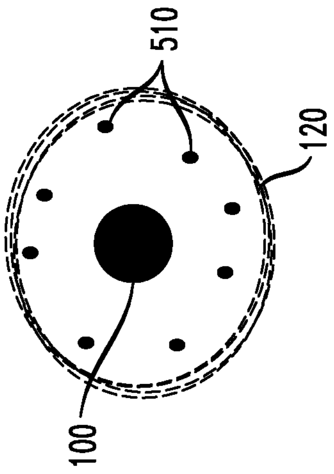
FIG. 5A is a plan view of a Wi-Fi network consisting of the smart antenna of FIG. 1 configured in an arrangement corresponding to all four omni antennas being selected.

FIG. 5A is a plan (i.e., top-down) view of a Wi-Fi network 500A consisting of smart antenna 100 of FIG. 1 configured in an arrangement corresponding to all four omni antennas 120 being selected. As shown in FIG. 5A, this arrangement is suitable to cover the eight different client devices 510 that are located near smart antenna 100.

Figure 5B:
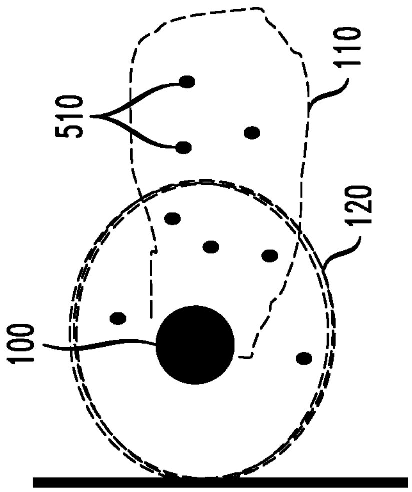
FIG. 5B is a plan view of a Wi-Fi network consisting of the smart antenna of FIG. 1 configured in an arrangement corresponding to one high-gain antenna and three omni antennas being selected.

FIG. 5B is a plan view of a Wi-Fi network 500B consisting of smart antenna 100 of FIG. 1 configured in an arrangement corresponding to one high-gain antenna 110 and three omni antennas 120 being selected. As shown in FIG. 5B, this arrangement is suitable to cover the eight different client devices 510 that are located near smart antenna 100.

Figure 5C:
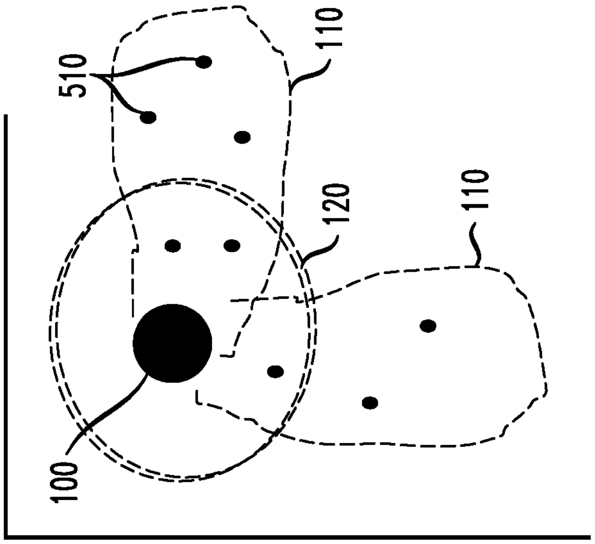
FIG. 5C is a plan view of a Wi-Fi network consisting of the smart antenna of FIG. 1 configured in an arrangement corresponding to two high-gain antennas and two omni antennas being selected.

FIG. 5C is a plan view of a Wi-Fi network 5000 consisting of smart antenna 100 of FIG. 1 configured in an arrangement corresponding to two high-gain antennas 110 and two omni antennas 120 being selected. As shown in FIG. 5C, this arrangement is suitable to cover the eight different client devices 510 that are located near smart antenna 100.

Figure 6:
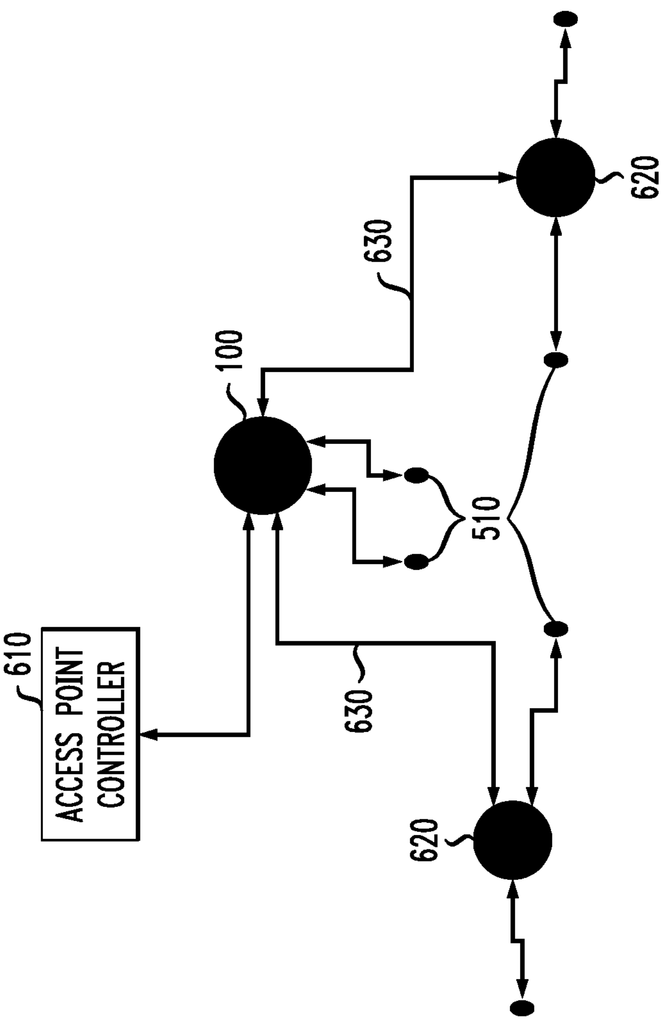
FIG. 6 is a plan view of a Wi-Fi network consisting of an electronic AP controller, the smart antenna of FIG. 1, and two wireless mesh nodes.

FIG. 6 is a plan view of a Wi-Fi network 600 consisting of an electronic access point (AP) controller 610, smart antenna 100 of FIG. 1, and two (e.g., stationary, omnidirectional) wireless mesh nodes (aka extenders) 620 that are wirelessly connected to smart antenna 100 via wireless backhaul 630, where AP controller 610 is hardwired to smart antenna 100 to control the operations of Wi-Fi network 600, including controlling the states of the RF switches 410(1)-410(4) of FIGS. 4A-4D to configure smart antenna 100 into one of its 16 possible arrangements and implementing a method for determining the optimal arrangement for smart antenna 100. Although not explicitly shown in FIGS. 5A-5C, each of those networks 500A-5000 also has an analogous AP controller hardwired to smart antenna 100.

As shown in FIG. 6, the six different client devices 510 are connected to smart antenna 100 either directly or via one of the mesh nodes 620 which is itself directly connected to smart antenna 100. As such, all six client devices 510 are said to be connected to the Wi-Fi network 600. In other Wi-Fi networks containing smart antenna 100 at the access point, a Wi-Fi-connected client device 510 might connect to smart antenna 100 via a sequence of two or more mesh nodes 620, where the mesh node 620 that is directly connected to the client device 510 is itself indirectly connected to smart antenna 100 via one or more other mesh nodes 620.

For a given Wi-Fi network comprising smart antenna 100 and zero, one, or more mesh nodes 620, it is desirable to determine how to control the RF switches 410 to select the high-gain and omni antennas 110 and 120 to configure smart antenna 100 in an optimal arrangement for that Wi-Fi network. As described below, that determination of the optimal arrangement for smart antenna 100 may be based on (i) the connections that the Wi-Fi network has with client devices 510 or (ii) the connections that smart antenna 100 has with the mesh nodes 620.

Figures 7, 8:
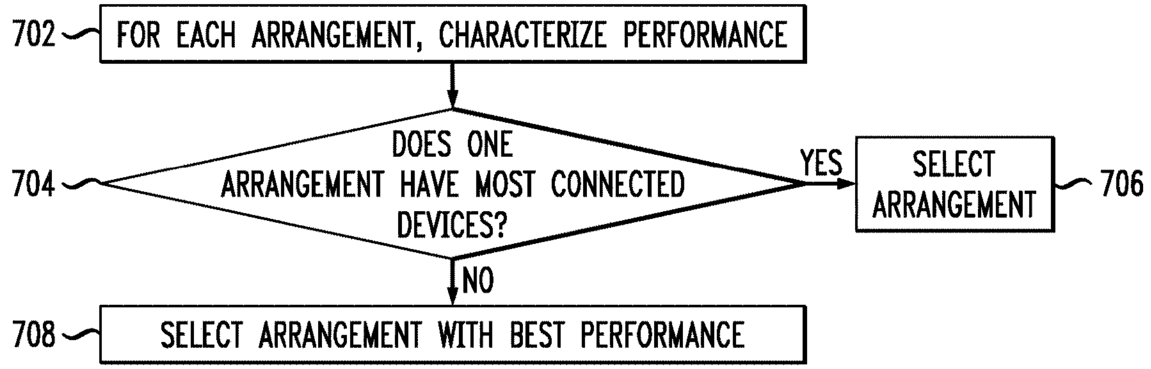
FIG. 7 is a flow diagram of a first method for determining an optimal arrangement for the smart antenna of FIG. 1 in a Wi-Fi network.
FIG. 8 presents an example table 800 that tabulates the values for three different performance parameters for the connected devices considered in parallel for one possible implementation of the method of FIG. 7.

FIG. 7 is a flow diagram of a method 700 for determining an optimal arrangement for smart antenna 100 of FIG. 1 in a Wi-Fi network having smart antenna 100 and zero, one, or more mesh nodes 620, according to a first embodiment. In step 702, smart antenna 100 is sequentially configured in each of its 16 different arrangements described previously. For each arrangement, depending on the particular implementation of method 700, the performance of the Wi-Fi network is characterized in a number of different ways, including (i) counting the number of devices (i.e., either client devices 510 or mesh nodes 620, depending on the particular implementation of method 700) that can connect to the Wi-Fi network containing smart antenna 100 in the current arrangement and (ii) determining one or more of the following performance parameters:

- Sum of the downlink (DL) throughput (TP) for the connected devices;
- Average DL TP per connected device;
- Sum of the uplink (UL) TP for the connected devices;
- Average UL TP per connected device;
- Sum of the RSSI (received signal strength) levels for the connected device; and
- Average RSSI per connected device.

Note that, in some implementations, each individual RSSI measurement is the strength of the signal received from the corresponding connected device as measured at the directly connected network receiver (i.e., either smart antenna 100 or a mesh node 620). In other implementations, each individual RSSI measurement is the strength of the signal received from the directly connected transmitter (i.e., either smart antenna 100 or a mesh node 620) as measured at the corresponding connected device and reported to the AP controller via in-band signaling. Those skilled in the art will understand that other suitable performance parameters may be used in addition to or instead of some or all of the listed performance parameters.

In step 704, if, for one of the 16 arrangements of smart antenna 100, the Wi-Fi network connects to more devices than for any of the other 15 arrangements, then, in step 706, that one arrangement is selected. Otherwise, two or more of the 16 arrangements tie for the highest number of devices connected to the Wi-Fi network and processing continues to step 708, where the performances of those two or more arrangements having the same highest number of connected devices are compared to break the tie and select the arrangement having the best performance.

In an implementation of method 700 in which the tie-breaker of step 708 involves only one performance parameter, that performance parameter is used to select the arrangement having the best performance. For example, if the performance parameter is average RSSI per connected device, then, for the two or more arrangements having the same highest number of connected devices as determined in step 704, the arrangement having the highest average RSSI per connected device is selected in step 708.

If two or more of those arrangements have the same highest average RSSI per connected device, then a different performance parameter may be used as the next tie breaker. For example, if sum of UL TP of connected devices is used as the next tiebreaker, for the two or more arrangements having the same highest number of connected devices and the same highest average RSSI per connected device, then the arrangement having the greatest sum of UL TP is selected in step 708. And so on, if necessary, using other performance parameters sequentially until the tie is broken.

In an alternative implementation of method 700, instead of applying a number of different performance parameters serially to break a tie between two or more different arrangements having the same highest number of connected devices, two or more different performance parameters are applied in parallel. Consider, for example, an implementation that applies the sum of DL TP for the connected devices, the average UL TP per connected device, and the average RSSI per connected device in parallel.

FIG. 8 presents an example table 800 that tabulates the values for the sum of DL TP for the connected devices (column B), the average UL TP per connected device (column D), and the average RSSI per connected device (column E) in parallel for four different arrangements (column A) that have the same highest number of connected devices. As shown in column B of FIG. 8, arrangement #4 has the highest sum of DL TP, arrangement #2 has the second highest sum of DL TP, arrangement #3 has the third highest sum of DL TP, and arrangement #1 has the lowest sum of DL TP. As such, for this performance parameter, in column C, arrangement #4 is assigned a rank of 1, arrangement #2a rank of 2, arrangement #3a rank of 3, and arrangement #1a rank of 4. In analogous manner, the four arrangements are assigned ranks of 1 to 4 for the two other performance parameters (columns E and G). The sum of the ranks for each arrangement are then determined (column H). As shown in column H, arrangement #4 has the lowest rank sum of 4. As such, arrangement #4 is selected in step 708 of FIG. 7.

Note that, if two or more arrangements have the same performance parameter value, then they are assigned the same rank. For example, if arrangements #2 and #3 both had a sum of DL TP of 1100 Mbps, then those two arrangements could both be assigned a rank of 2 (or maybe 2.5), with arrangement #4 still being assigned a rank of 1 and arrangement #1 still being assigned a rank of 4.

Similarly, if two of more arrangements have the same lowest rank sum, then a suitable performance parameter can be used to break that tie, where that performance parameter may be one of the parallel-applied performance parameters or a different performance parameter.

In one possible implementation of method 700 of FIG. 7, the Wi-Fi network has only smart antenna 100, and the connected devices are client devices 510. In that implementation, method 700 identifies the one or more arrangements for smart antenna 100 that enable smart antenna 100 to connect to the highest number of client devices 510 and, if two or more of those arrangements connect to the same highest number of client devices 510, then method 700 selects the arrangement that provides the best performance based on one or more performance parameters for the client devices 510 considered either serially or in parallel.

In another possible implementation of method 700 of FIG. 7, the Wi-Fi network has smart antenna 100 and one or more mesh nodes 620, and the connected devices are client devices 510. In that implementation, method 700 identifies the one or more arrangements for smart antenna 100 that enable the Wi-Fi network to connect to the highest number of client devices 510 and, if two or more of those arrangements connect to the same highest number of client devices 510, then method 700 selects the arrangement that provides the best performance based on one or more performance parameters for the client devices 510 considered either serially or in parallel.

In yet another possible implementation of method 700 of FIG. 7, the Wi-Fi network has smart antenna 100 and one or more mesh nodes 620, and the connected devices are mesh nodes 620. In that implementation, method 700 identifies the one or more arrangements for smart antenna 100 that enable smart antenna 100 to connect to the highest number of mesh nodes 620 and, if two or more of those arrangements connect to the same highest number of mesh nodes 620, then method 700 selects the arrangement that provides the best performance based on one or more performance parameters for the mesh nodes 620 considered either serially or in parallel.

Figure 9:
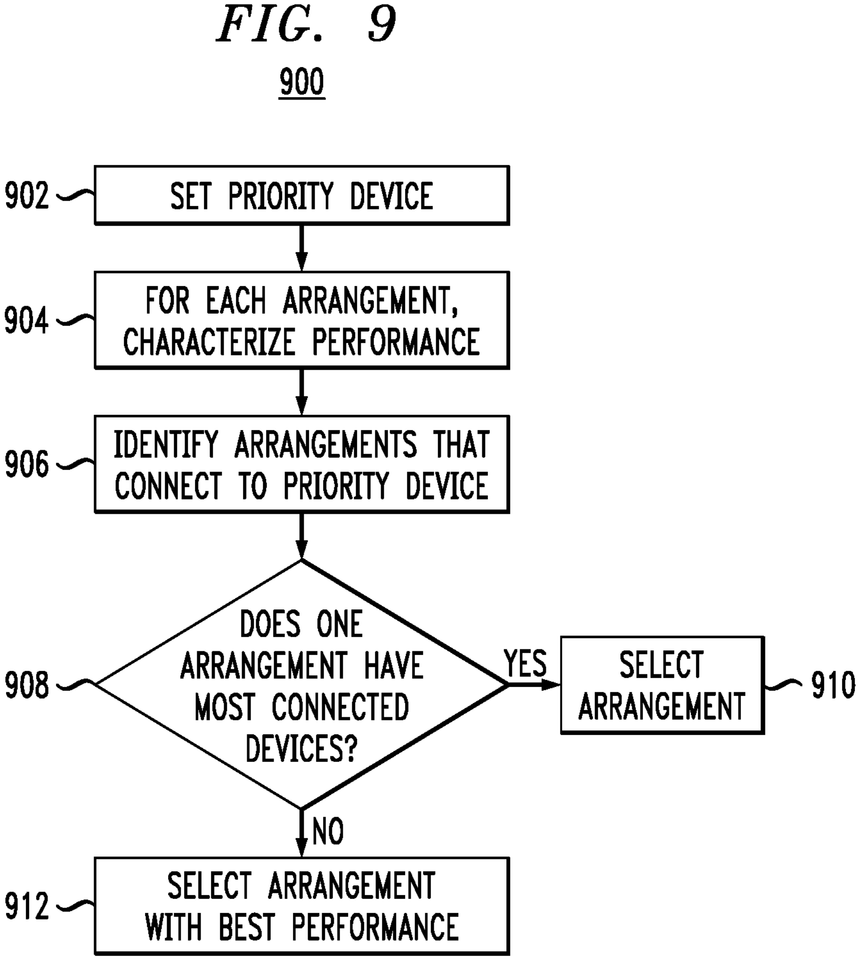
FIG. 9 is a flow diagram of a second method for determining an optimal arrangement for the smart antenna of FIG. 1 in a Wi-Fi network.

FIG. 9 is a flow diagram of a method 900 for determining an optimal arrangement for smart antenna 100 of FIG. 1 in a Wi-Fi network having smart antenna 100 and zero, one, or more mesh nodes 620, according to a second embodiment. In step 902, one of the devices (i.e., either a client device 510 or a mesh node 620, depending on the particular implementation of method 900) is set as the priority device, which is deemed to be more important than any of the other devices.

In some implementations, the priority device may be the device used most frequently and/or having the highest throughput. In that case, the AP controller could collect network statistics over time and use the results to automatically determine which device should be the priority device. In other implementations, an end user may be able to manually select the priority device via a device local management system like a WebGUI or a smart phone application by programming the AP controller. Alternatively, the priority device could be set by a service provider by programming the AP controller via a device remote management interface TR069 or equivalent.

In step 904, smart antenna 100 is sequentially configured in each of the 16 different arrangements described previously. For each arrangement, depending on the particular implementation of method 900, the performance of the Wi-Fi network is characterized in a number of different ways, including counting the number of devices that can connect to the Wi-Fi network containing smart antenna 100 in the current arrangement and determining one or more of the following performance parameters:

DL TP for the priority device;

UL TP for the priority device; and

RSSI for the priority device.

Those skilled in the art will understand that other suitable performance parameters may be used in addition to or instead of some or all of the listed performance parameters.

In step 906, only those arrangements that connect to the priority device are retained. All other arrangements that cannot connect to the priority device are eliminated from consideration no matter how many other devices are connected to the Wi-Fi network for those arrangements.

In step 908, if, for one of the retained arrangements of smart antenna 100, the Wi-Fi network connects to more devices than for any of the other retained arrangements, then, in step 910, that one retained arrangement is selected. Otherwise, two or more of the retained arrangements tie for the highest number of devices connected to the Wi-Fi network and processing continues to step 912, where the performances of those two or more retained arrangements having the same highest number of connected devices are compared to break the tie and select the retained arrangement having the best performance.

In an implementation of method 900 in which the tie-breaker of step 912 involves only one performance parameter for the priority device, then that performance parameter is used to select the arrangement having the best performance. For example, if the performance parameter is the RSSI for the priority device, then, for the two or more retained arrangements having the same highest number of connected devices as determined in step 908, the retained arrangement having the highest RSSI for the priority device is selected in step 912.

If two or more of those retained arrangements have the same highest RSSI for the priority device, then a different performance parameter for the priority device may be used as the next tie breaker. For example, if UL TP of the priority device is used as the next tiebreaker, for the two or more retained arrangements having the same highest number of connected devices and the same highest RSSI for the priority device, then the arrangement having the greatest UL TP for the priority device is selected in step 912. And so on, if necessary, using other performance parameters for the priority device sequentially until the tie is broken.

In an alternative implementation of method 900, instead of applying a number of different performance parameters for the priority device serially to break a tie between two or more different retained arrangements having the same highest number of connected devices, two or more different performance parameters for the priority device are applied in parallel. Consider, for example, an implementation that applies the DL TP for the priority device, the UL TP for the priority device, and the RSSI for the priority device in parallel.

FIG. 10 presents a table 1000 that tabulates the values for the DL TP for the priority device (column B), the UL TP for the priority device (column D), and the RSSI for the priority device (column F) in parallel for four different retained arrangements that have the same highest number of connected devices (column A). As shown in column B of FIG. 10, arrangement #4 has the highest DL TP, arrangement #2 has the second highest DL TP, arrangement #3 has the third highest DL TP, and arrangement #1 has the lowest DL TP. As such, for this performance parameter, in column C, arrangement #4 is assigned a rank of 1, arrangement #2 a rank of 2, arrangement #3 a rank of 3, and arrangement #1 a rank of 4. In analogous manner, the four arrangements are assigned ranks of 1 to 4 for the two other performance parameters (columns E and G). The sum of the ranks for each arrangement are then determined (column H). As shown in column H, arrangement #4 has the lowest rank sum of 4. As such, arrangement #4 is selected in step 912 of FIG. 9.

Note that, if two or more retained arrangements have the same performance parameter value, then they are assigned the same rank. For example, if arrangements #2 and #3 both had a DL TP of 400 Mbps, then those two arrangements could both be assigned a rank of 2 (or maybe 2.5), with arrangement #4 still being assigned a rank of 1 and arrangement #1 still being assigned a rank of 4.

Similarly, if two of more retained arrangements have the same lowest rank sum (column G), then a suitable performance parameter can be used to break that tie, where that performance parameter may be one of the parallel-applied performance parameters or a different performance parameter.

In one possible implementation of method 900 of FIG. 9, the Wi-Fi network has only smart antenna 100, and the connected devices are client devices 510. In that implementation, the priority device is a client device 510, and method 900 retains the arrangements for smart antenna 100 that enable smart antenna 100 to connect to the priority client device 510. Method 900 then identifies the one or more retained arrangements having the highest number of connected client devices 510 and, if two or more of those retained arrangements connect to the same highest number of client devices 510, then method 900 selects the retained arrangement that provides the best performance based on one or more performance parameters for the priority client device 510 considered either serially or in parallel.

In another possible implementation of method 900 of FIG. 9, the Wi-Fi network has smart antenna 100 and one or more mesh nodes 620, and the connected devices are client devices 510. In that implementation, the priority device is a client device 510, and method 900 retains the arrangements for smart antenna 100 that enable the Wi-Fi network to connect to the priority client device 510. Method 900 then identifies the one or more retained arrangements having the highest number of connected client devices 510 and, if two or more of those retained arrangements connect to the same highest number of client devices 510, then method 900 selects the retained arrangement that provides the best performance based on one or more performance parameters for the priority client device 510 considered either serially or in parallel.

In yet another possible implementation of method 900 of FIG. 9, the Wi-Fi network has smart antenna 100 and one or more mesh nodes 620, and the connected devices are mesh nodes 620. In that implementation, the priority device is a mesh node 620, and method 900 retains the arrangements for smart antenna 100 that enable smart antenna 100 to connect to the priority mesh node 620. Method 900 then identifies the one or more retained arrangements for smart antenna 100 that enable smart antenna 100 to connect to the highest number of connected mesh nodes 620 and, if two or more of those retained arrangements connect to the same highest number of mesh nodes 620, then method 900 selects the retained arrangement that provides the best performance based on one or more performance parameters for the priority mesh node 620 considered either serially or in parallel.

Although not explicitly shown in the figures, each node in the figures has at least one processor (e.g., a CPU) for processing incoming and/or outgoing data, memory (e.g., RAM, ROM) for storing data and (in some implementations) program code to be executed by the processor, and communication hardware (e.g., transceivers) for communicating with one or more other nodes.

Unless explicitly stated otherwise, each numerical value and range should be interpreted as being approximate as if the word "about" or "approximately" preceded the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

As used herein in reference to an element and a standard, the terms "compatible" and "conform" mean that the element communicates with other elements in a manner wholly or partially specified by the standard, and would be recognized by other elements as sufficiently capable of communicating with the other elements in the manner specified by the standard. A compatible or conforming element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. Upon being provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As will be appreciated by one of ordinary skill in the art, the present disclosure may be embodied as an apparatus (including, for example, a system, a network, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system" or "network".

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, upon the program code being loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, upon the program code being loaded into and executed by a machine, such as a computer, the machine becomes an apparatus for practicing the disclosure. Upon being implemented on a general-purpose processor, the program code segments combine with the processor to provide a unique device that operates analogously to specific logic circuits.

The term "non-transitory," as used herein, is a limitation of the medium itself (i.e., tangible, not a signal) as opposed to a limitation on data storage persistency (e.g., RAM vs. ROM).

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. For example, the phrases "at least one of A and B" and "at least one of A or B" are both to be interpreted to have the same meaning, encompassing the following three possibilities: 1—only A; 2—only B; 3—both A and B.

All documents mentioned herein are hereby incorporated by reference in their entirety or alternatively to provide the disclosure for which they were specifically relied upon.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. A controller-implemented method for configuring a smart antenna having a plurality of arrangements in a wireless network, each arrangement having a corresponding antenna pattern, the method comprising an electronic controller of the wireless network:

characterizing performance of the wireless network for each arrangement;

rating the characterized performances for the plurality of arrangements;

selecting an arrangement having a highest-rated characterized performance; and configuring the smart antenna based on the selected arrangement, wherein:

for each arrangement, characterizing the performance comprises determining a number of connected devices;

upon determining that only one arrangement is associated with a greater number of connected devices than all other arrangements, then selecting the one arrangement as having the highest-rated characterized performance; and upon determining that two or more arrangements are associated with a same, greater number of connected devices than all other arrangements, then using one or more other performance parameters to select the arrangement having the highest-rated characterized performance from among the two or more arrangements associated with the same, greater number of connected devices than all other arrangements.

2. The method of claim 1, further comprising:

selecting a single priority device; and requiring the selected arrangement to connect to the single priority device.

3. The method of claim 1, wherein two or more other performance parameters are applied serially to select the arrangement having the highest-rated characterized performance.

4. The method of claim 1, wherein two or more other performance parameters are applied in parallel to select the arrangement having the highest-rated characterized performance.

5. The method of claim 1, wherein:

the characterized performances are rated based on the one or more performance parameters for only a single specified priority device; and the one or more performance parameters comprise one or more of:

downlink (DL) throughput (TP) for the single priority device;

uplink (UL) TP for the single priority device; and received signal strength (RSSI) for the single priority device.

6. The method of claim 1, wherein:

the characterized performances are rated based on the one or more performance parameters for all connected devices; and the one or more performance parameters comprise one or more of:

sum of DL TP for the connected devices;

average DL TP for the connected devices;

sum of UL TP for the connected devices;

average UL TP for the connected devices;

sum of RSSI for the connected devices; and average RSSI for the connected devices.

7. The method of claim 1, wherein:

the wireless network comprises the smart antenna as its only wireless node; and the connected devices are client devices that are connected to the smart antenna.

8. The method of claim 1, wherein:

the wireless network comprises the smart antenna and one or more mesh nodes; and the connected devices are client devices that are connected to the wireless network.

9. The method of claim 1, wherein:

the wireless network comprises the smart antenna and one or more mesh nodes; and the connected devices are mesh nodes that are connected to the smart antenna.

10. The method of claim 1, wherein:

the wireless network is a Wi-Fi network;

the characterized performances are rated based on the one or more performance parameters for all connected devices.

11. The method of claim 10, wherein two or more other performance parameters are applied serially to select the arrangement having the highest-rated characterized performance.

12. The method of claim 10, wherein two or more other performance parameters are applied in parallel to select the arrangement having the highest-rated characterized performance.

13. The method of claim 10, wherein the one or more performance parameters comprise one or more of:

sum of DL TP for the connected devices;

average DL TP for the connected devices;

sum of UL TP for the connected devices;

average UL TP for the connected devices;

sum of RSSI for the connected devices; and average RSSI for the connected devices.

14. The method of claim 1, wherein:

the wireless network is a Wi-Fi network;

a single priority device is selected;

only arrangements that connect to the single priority device are retained; and the characterized performances are rated based on the one or more performance parameters for only the single priority device.

15. The method of claim 14, wherein two or more other performance parameters are applied serially to select the retained arrangement having the highest-rated characterized performance.

16. The method of claim 14, wherein two or more other performance parameters are applied in parallel to select the retained arrangement having the highest-rated characterized performance.

17. The method of claim 14, wherein the one or more performance parameters comprise one or more of:

DL TP for the single priority device;

UL TP for the single priority device; and

RSSI for the single priority device.

18. A controller for configuring a smart antenna having a plurality of arrangements in a wireless network, each arrangement having a corresponding antenna pattern, the controller comprising at least one processor and at least one memory storing instructions that, upon being executed by the at least one processor, cause the controller at least to:

characterize performance of the wireless network for each arrangement;

rate the characterized performances for the plurality of arrangements;

select an arrangement having a highest-rated characterized performance; and configure the smart antenna based on the selected arrangement, wherein:

for each arrangement, the controller is configured to characterize the performance by determining a number of connected devices;

upon determining that only one arrangement is associated with a greater number of connected devices than all other arrangements, then the controller is configured to select the one arrangement as having the highest-rated characterized performance; and upon determining that two or more arrangements are associated with a same, greater number of connected devices than all other arrangements, then the controller is configured to use one or more other performance parameters to select the arrangement having the highest-rated characterized performance from among the two or more arrangements associated with the same, greater number of connected devices than all other arrangements.

19. The controller of claim 18, wherein the controller is configured to apply two or more other performance parameters serially to select the arrangement having the highest-rated characterized performance.

20. The controller of claim 18, wherein the controller is configured to apply two or more other performance parameters in parallel to select the arrangement having the highest-rated characterized performance.

21. The controller of claim 18, wherein the controller is configured to require the selected arrangement to connect to a single selected priority device.

* * * * *